United States Patent
Ding et al.

(10) Patent No.: US 11,347,533 B2
(45) Date of Patent: May 31, 2022

(54) ENHANCED VIRTUAL MACHINE IMAGE MANAGEMENT SYSTEM

(71) Applicant: MICROSOFT TECHNOLOGY LICENSING, LLC, Redmond, WA (US)

(72) Inventors: Jing Ding, Sammamish, WA (US); Jiangfeng Cai, Redmond, WA (US); Peter Kenneth Harwood, Bellevue, WA (US); Nicola G. Alfeo, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 123 days.

(21) Appl. No.: 16/563,589

(22) Filed: Sep. 6, 2019

(65) Prior Publication Data

US 2021/0073018 A1   Mar. 11, 2021

(51) Int. Cl.
*G06F 9/455* (2018.01)
*G06F 8/65* (2018.01)
*G06F 11/36* (2006.01)
*H04L 67/10* (2022.01)

(52) U.S. Cl.
CPC ............ *G06F 9/45558* (2013.01); *G06F 8/65* (2013.01); *G06F 11/3664* (2013.01); *G06F 2009/45562* (2013.01); *H04L 67/10* (2013.01)

(58) Field of Classification Search
CPC ......... G06F 8/65; G06F 9/45558; H04L 67/10
USPC .......................................................... 718/1
See application file for complete search history.

(56) References Cited

U.S. PATENT DOCUMENTS

| | | | |
|---|---|---|---|
| 6,546,506 B1 * | 4/2003 | Lewis | G06Q 10/06 714/38.1 |
| 8,639,787 B2 | 1/2014 | Lagergren et al. | |
| 9,459,856 B2 | 10/2016 | Curzi et al. | |
| 10,379,845 B2 * | 8/2019 | Parees | G06F 8/40 |
| 2011/0126197 A1 | 5/2011 | Larsen et al. | |
| 2012/0089972 A1 | 4/2012 | Scheidel et al. | |
| 2012/0192179 A1 | 7/2012 | Ammons et al. | |
| 2015/0058461 A1 | 2/2015 | Guiditta et al. | |
| 2018/0025160 A1 * | 1/2018 | Hwang | G06F 8/71 726/25 |
| 2019/0138288 A1 | 5/2019 | Brealey et al. | |

(Continued)

OTHER PUBLICATIONS

"International Search Report & Written Opinion Issued in PCT Application No. PCT/US20/038269", dated Oct. 12, 2020, 14 Pages.

(Continued)

*Primary Examiner* — Timothy A Mudrick
(74) *Attorney, Agent, or Firm* — Scott Y. Shigeta; Newport IP, LLC (57) ABSTRACT

Methods, systems, and computing devices for the automation of the building and validating of an updated VM product image within a data pipeline. The disclosed systems can also determine if the updated VM product image should be validated by testing the updated VM product image based on the risk of the update data to the functionality of the updated VM product image. By automating the process of building and validating VM product images within a data pipeline, a system can mitigate the time lag caused by traditional processes, which use manually initiated steps in creating VM images and separately manually initiated tools for validating VM images.

17 Claims, 6 Drawing Sheets

(56) References Cited

U.S. PATENT DOCUMENTS

2019/0138431 A1    5/2019  Holbrook
2020/0225917 A1*   7/2020  Jung .................. G06F 9/45558

OTHER PUBLICATIONS

"Introduction to Packer", Retrieved From: https://web.archive.org/web/20190611193416/http://www.packer.io/intro/, Jun. 11, 2019, 1 Page.

Cynthn, "Preview: Azure Image Builder overview", Retrieved From: https://docs.microsoft.com/en-us/azure/virtual-machines/linux/image-builder-overview?toc-%2fazure%2fvirtual-machines%2fwindows%2ftoc.json, May 2, 2019, 5 Pages.

* cited by examiner

ENHANCED VIRTUAL MACHINE IMAGE MANAGEMENT SYSTEM

BACKGROUND

Cloud service providers (CSP) offer network services, infrastructure, and/or applications in the cloud. Cloud services may be hosted in a data center that can be accessed by companies or individuals using network connectivity. CSPs are increasingly using Virtual Machine (VM) images to provide a large portion of these cloud services to users. For instance, when a user is accessing an application in the cloud, the user is most likely accessing a VM image which contains that particular application. Thus, VM images are a major resource for CSPs and the building and validating of VM images are key functions of CSPs.

Traditionally, building and validating a VM image can a be slow and inefficient process. For instance, traditional processes for creating and validating a VM image can be slow and inefficient because the process uses manually initiated steps in creating a VM image, uses manually initiated tools in validating a VM image and publishing a VM image. Specifically, creating, validating, publishing and replicating of a virtual machine for the provision of cloud services can be time intensive and inefficient for providers.

Also, some existing processes can be implemented in a disjointed fashion. For instance, a VM image may be created in one location and validated in a different location, i.e., a VM image may be manually instantiated on a developer's machine, then moved to a data center for validation testing. For example, an updated VM image of a cloud service on a VM image is created on a developer's machine in the developer's office, the updated VM image is manually initiated to move to a sand box test environment for testing, and after testing, the tested updated VM image is discarded.

Also traditionally, an update to a VM image is validated by applying the update to the VM image and testing the updated VM image. Thus, the traditional testing of an updated VM image can add many hours to the delivery of a validated updated VM image of a cloud service to the cloud. Further, the traditional testing of the updated VM image causes the additional use of computing resources when performing the traditional testing of applying the update to the VM image and re-testing the updated VM image.

Further, if an updated VM image is created on a developer's machine and the developer's machine is not available, then the updated VM image is not available for validation testing. Thus, often causing a delay in delivering the updated VM image of the cloud service to the cloud.

It is with respect to these and other technical challenges that the disclosure made herein is presented.

SUMMARY

The techniques disclosed herein provide improvements over existing systems by automating the building and validating of VM product images within a data pipeline. A data pipeline is a set of data processing elements connected in series, where the output of one element and/or the element is the input of the next one. By automating the process of building and validating VM product images within a data pipeline, a system can mitigate the time lag caused by traditional processes, which use manually initiated steps in creating VM images and separately manually initiated tools for validating VM images. Also, by automating the process of building and validating VM product images within a data pipeline, a system can provide the benefit of having the building and validating occurring within the same data pipeline. Further, in the building and validating of a VM product image within a data pipeline, the data pipeline can provide a unified approach in managing the installation of the prerequisites needed for a product to run.

The techniques disclosed herein can lead to a more efficient use of computing system resources. In particular, computer resources usage, such as memory usage, network usage, and processor usage, are used when traditionally validating an updated VM product image by testing the updated VM product image. However, by determining if the updated VM product image should be validated by testing the updated VM product image or should not be validated by testing the updated VM product image based on the risk of the update to the functionality of the updated VM product image, can reduce the use of computing resources used to deliver an updated VM product image to the cloud. For example, by not testing an updated VM product image because the risk of the update to the functionality of the updated VM product image is low, will result in less computer resources usage needed to deliver the updated VM product image to the cloud.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical to refer to each individual item. Generic references to the items may use the specific reference number without the sequence of letters.

DETAILED DESCRIPTION

Figure 1A:
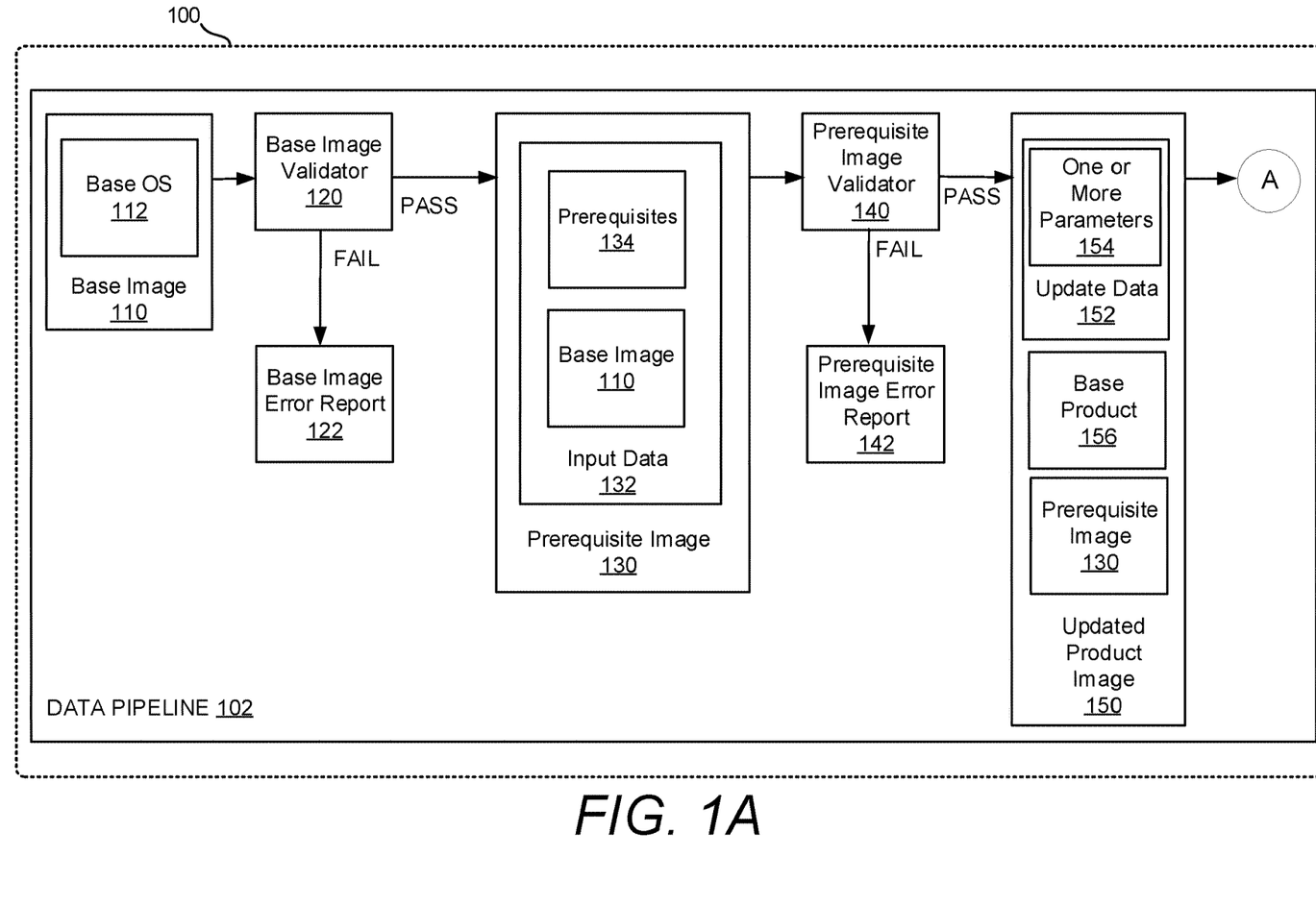
FIG. 1A and FIG. 1B illustrate a building and validating VM product image environment that can automate the building and validating of an updated VM product image within a data pipeline.
Figure 1B:
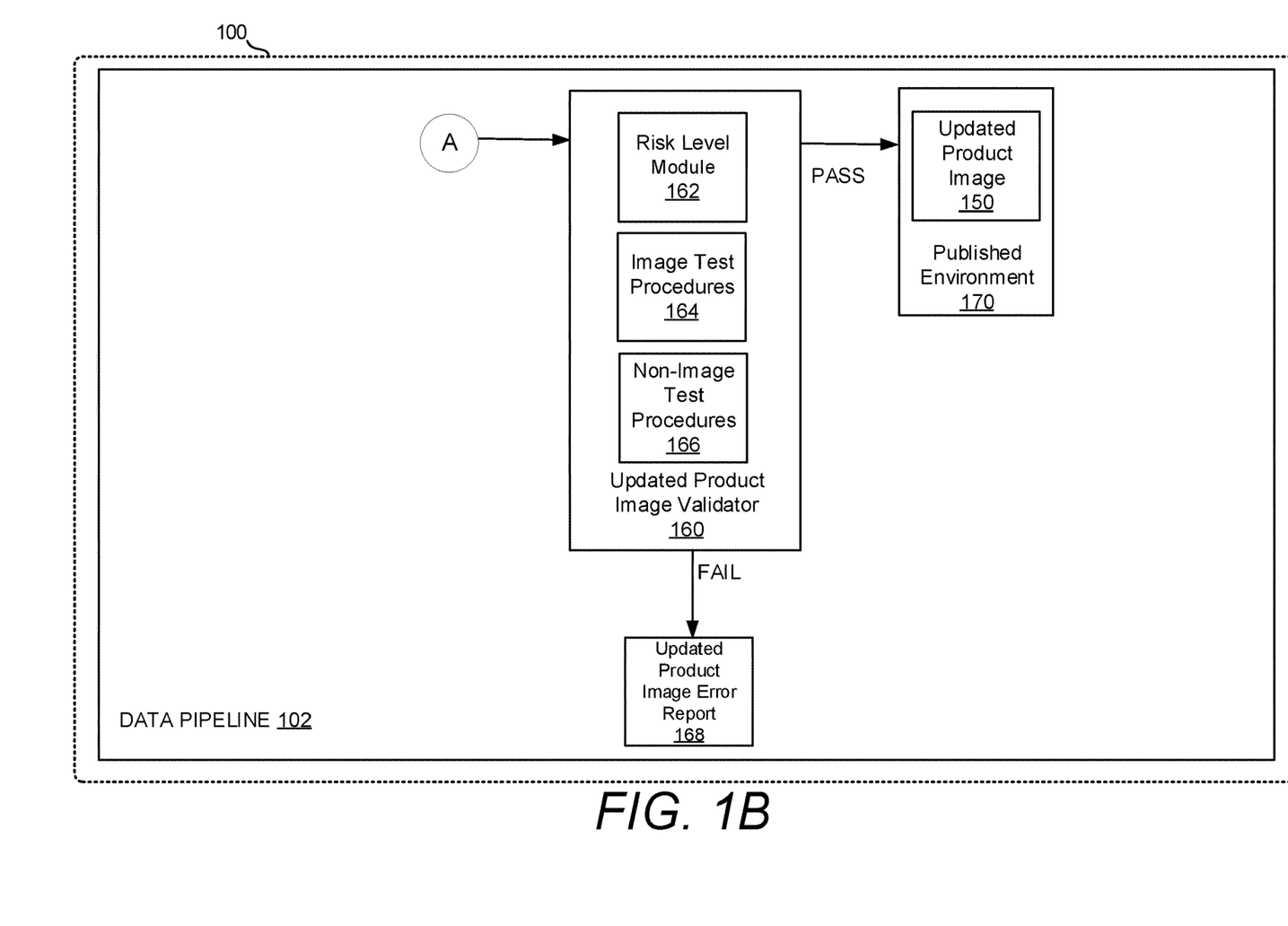

FIG. 1A and FIG. 1B illustrate a VM product image environment 100 that can automate a process for generating and validating of an updated VM product image 150 within a data pipeline 102. FIG. 1A and FIG. 1B also illustrate a building and validating a VM product image environment 100 that can determine if the updated VM product image 150 should be validated by testing the updated VM product image 150 based on the risk of the update data 152 to the functionality of the updated VM product image 150.

In one implementation of the building and validating a VM product image environment 100, the data pipeline 102 can occur within a computing device, a network of computing devices, or a data center of computing devices. A data pipeline 102 is a set of data processing elements connected in series, where the output of one element and/or the element is the input of the next element. For example, the updated product image 150 is an input to the updated product image validator 160. The inputs can be inputted automatically or manually.

The implementation includes receiving a base image 110. The base image 110 is an image of a base operating system 112. An image can be a copy of a software implementation of a task, a function, a feature, an application, a VM, and/or a VM with applications installed. The base image 110 can be provided by the operating system provider. The base image 110 is automatically validated by the base image validator 120. If the base image 110 passes validation, then the base image 110 is automatically sent to the prerequisite image 130, if the base image 110 fails validation, then a base image error report 122 is generated.

In response to the base image 110 passing validation, a prerequisite image 130 is automatically generated from input data 132 defining operating system functionality and components required by a base product 156 to run. The input data 132 includes prerequisites 134 and the base image 110. Prerequisites 134 are non-product components needed for the base product 156 to run. The Prerequisites 134 can include configuration components, base components, service base components, SQL, information services, libraries, setting applied to the image, ASP.NET, and/or .NET.

In response to the generation of the prerequisite image 130, the prerequisite image 130 is automatically validated by the prerequisite image validator 140. If the prerequisite image 130 passes validation, then the prerequisite image 130 is automatically sent to the updated product image 150, if the prerequisite image 130 fails validation, then a prerequisite image error report 142 is generated.

In response to the prerequisite image 130 passing validation, an updated product image 150 is automatically generated from the update data 152, the update data 152 includes one or more parameters 154, the base product 156, and the prerequisite image 130. The one or more parameters 154 can add, subtract, or modify a feature or features of the base product 156. For example, the one or more parameters 154 can be setting updates or configuration code settings. The one or more parameters 154 can be called commits.

The base product 156 could be an application. For example, the base product 156 can be an on-line application provided from the cloud. The base product 156 could also be a collection of features and services packaged for sale as a unit that solve a well-defined problem for a market of similar buyers using one or more computer programs. The base product 156 could also be a collection of features and services packaged for sale as a unit designed to perform a group of coordinated functions, tasks, or activities for the benefit of the user using one or more computer programs. The base product 156 could also be merchandise consisting of a computer program that is offered for sale.

In another implementation, the base product 156 can also be the product plus a feature of the product turned on or off. For example, the base product 156 can be an on-line application with the e-mail feature turned on or turned off. This allows for the base product 156 to be represented by one of the multiple combinations of the base product 156 plus a feature or features of the base product 156 turned on or off. This also allows for multiple updated product images to be available based on the multiple combinations of the base product 156 plus a feature or features of the base product 156 turned on or off. This allows for the risk of the update data 152 to the functionality of the updated product image 150 to be measured against products with different features.

In another implementation, the updated product image 150 is automatically generated from a previously generated updated product image and the one or more parameters 154. The one or more parameters 154 can add, subtract, or modify a feature or features of the base product 156 in the previously generated updated product image. This allows for the updated product image 150 to be an update of a previously generated updated product image.

In response to the generation of the updated product image 150, the updated product image 150 is automatically validated by the updated product image validator 160. The updated product image validator 160 includes a risk level module 162, image test procedures 164, and non-image test procedures 164. In an implementation, the risk level module 162 determines the level of risk of the update data 152 to the functionality of the updated product image 150. For example, the risk level module 162 can determine the level of risk of the update data 152 to the functionality of the updated product image (150) by receiving the level of risk from an outside source, an inside source, historical data, or a user. In response to the risk level exceeding a threshold value, a subset of tests from the image test procedures (164) and/or the non-image test procedures (166) are selected based on the risk level. For example, if the received risk level exceeds the threshold, then the selected subset of tests includes at least one test from the image test procedures (164). However, if the received risk level does not exceeds the threshold, then the selected subset of tests includes at least one test from the non-image test procedures (166).

In another implementation, the risk level module 162 determines the level of risk of the update data 152 to the functionality of the updated product image 150. The level of risk of the update data 152 to the functionality of the updated product image 150 is based on the length of time needed for a test from the image test procedures 164 to test the updated product image 150 with the update data 152 applied. For example, on a risk scale of 1 to 100, or on any similar scale, if the length of time needed to test a test from the image test procedures 164 was in seconds, then the risk level would be in the lower portion of the risk scale. However, if the length of time needed to test a test from the image test procedures 164 was in hours, then the risk level would be in the higher portion of the risk scale. The length of time for a test to test the updated product image 150 with the update data 152 applied can be received from an outside source, an inside source, historical data, or a user.

In another implementation, the level of risk of the update data 152 to the functionality of the updated product image 150 is based on the type of update data 152 to the updated product image 150 with the update data 152 applied. For example, on a risk scale of 1 to 100, or on any similar scale, a monthly update, a .NET update, a update to the operating system version number, or an update to the .Net version number are all high risk updates and the risk level would be in the higher portion of the risk scale. However, an update that moves a pixel to another location, may be concerned a low risk update and the risk level would be in the lower portion of the risk scale. The risk level for the type of the update data 152 to the functionality of the updated product image 150 with the update data 152 applied can be received by an outside source, an inside source, historical data, or a user.

If the determined risk level, determined by the risk level module 162, exceeds a threshold value, then the updated product image 150 is validated based on testing of the updated product image 150 using one or more test from the image test procedures 164 to test on the updated product image 150. If the risk level does not exceed a threshold value, then the updated product image 150 is validated based on testing of the updated product image 150 using one or more of the non-image test procedures 166 to test on the updated product image 150. For example, only testing the syntax of the update data 152 can be considered a non-image testing procedure. Also, the threshold value can be received from an outside source, an inside source, historical data, or a user.

If the updated product image 150 passes validation, then the updated product image 150 is automatically sent to the published environment 170, if the updated product image 150 fails validation, then an updated product image error report 168 is generated and sent to the creator of the update data 152. The published environment 170 can be a data center.

In another implementation, the published environment 170 can be a test lab. In the test lab, the updated product image 150 is tested for validation. If the updated product image 150 passes validation, then the updated product image 150 is automatically published to a private portion of a data center or to the data center, if the updated product image 150 fails validation, then a published environment error report is generated. For example, published can be granting permissions to a predefined group of users of the updated product image 150.

In another implementation, the published environment 170 can be a private portion of a data center. In the private portion of a data center, the updated product image 150 is tested for validation. If the updated product image 150 passes validation, then the updated product image 150 is automatically published to the data center, if the updated product image 150 fails validation, then a published environment error report is generated.

Figure 2:
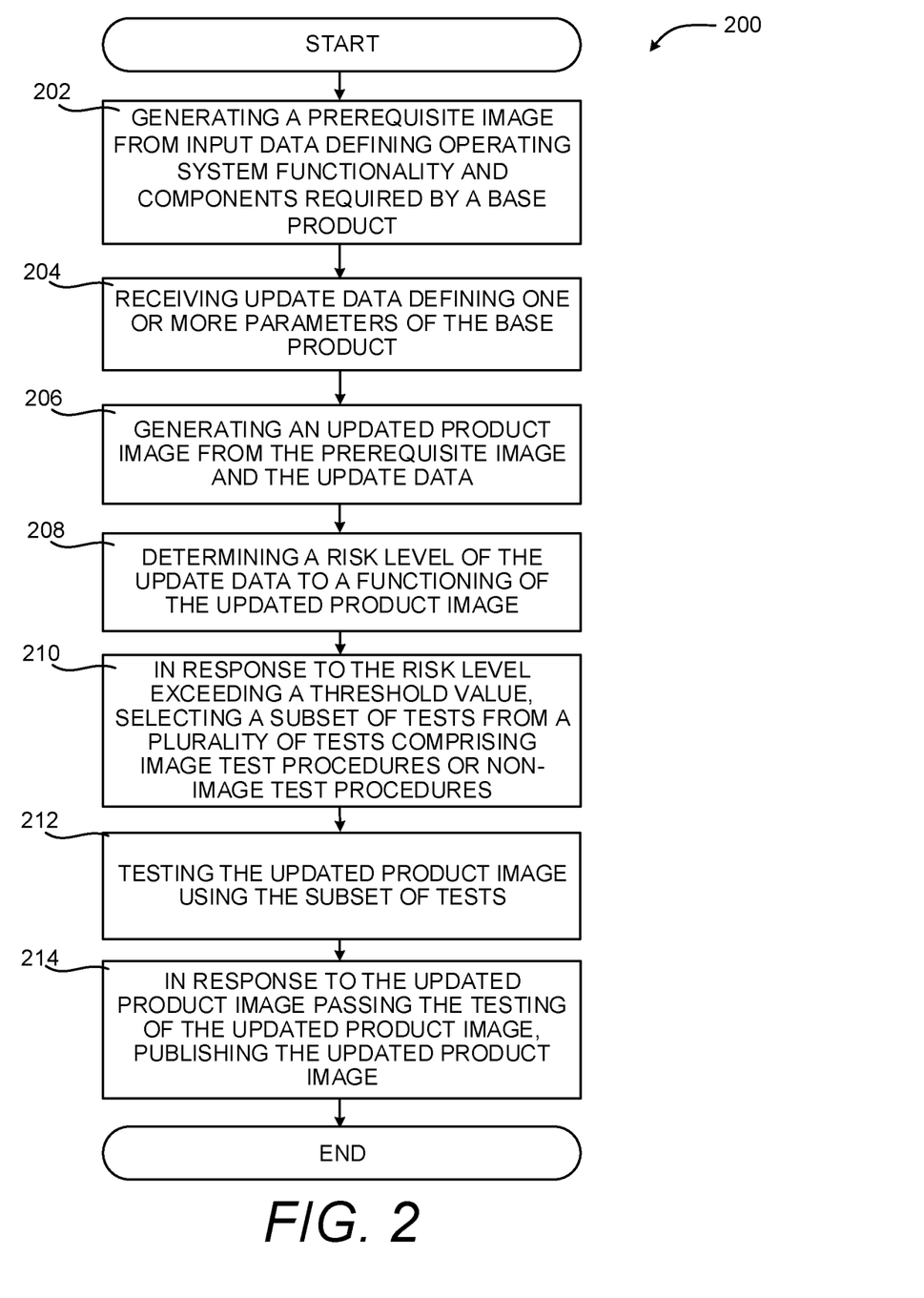
FIG. 2 is a flow diagram illustrating one example of a method of the building and validating of an updated VM product image.
Figure 3:
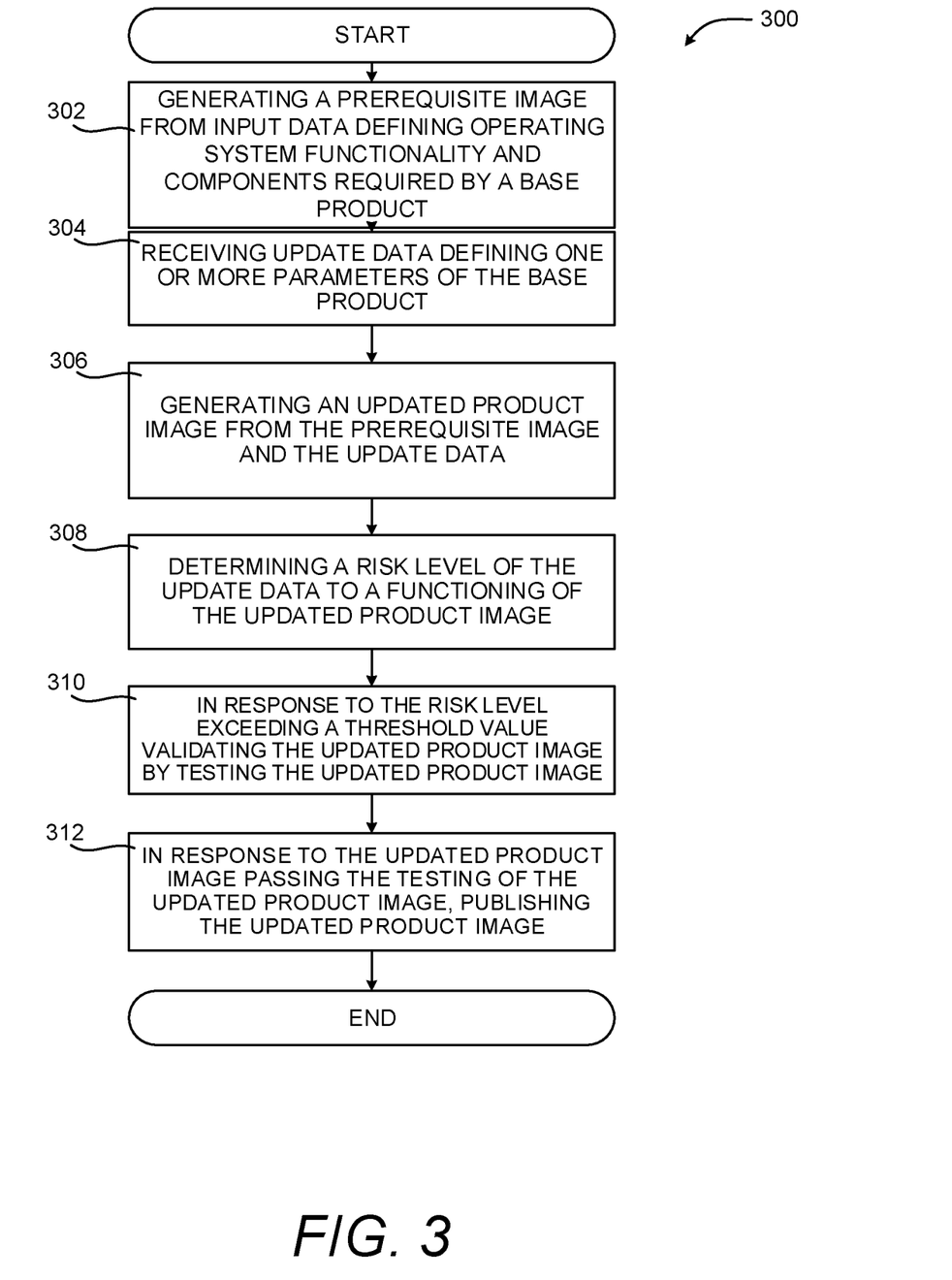
FIG. 3 is a flow diagram illustrating one example of a system capable of the building and validating of an updated VM product image.
Figure 4:
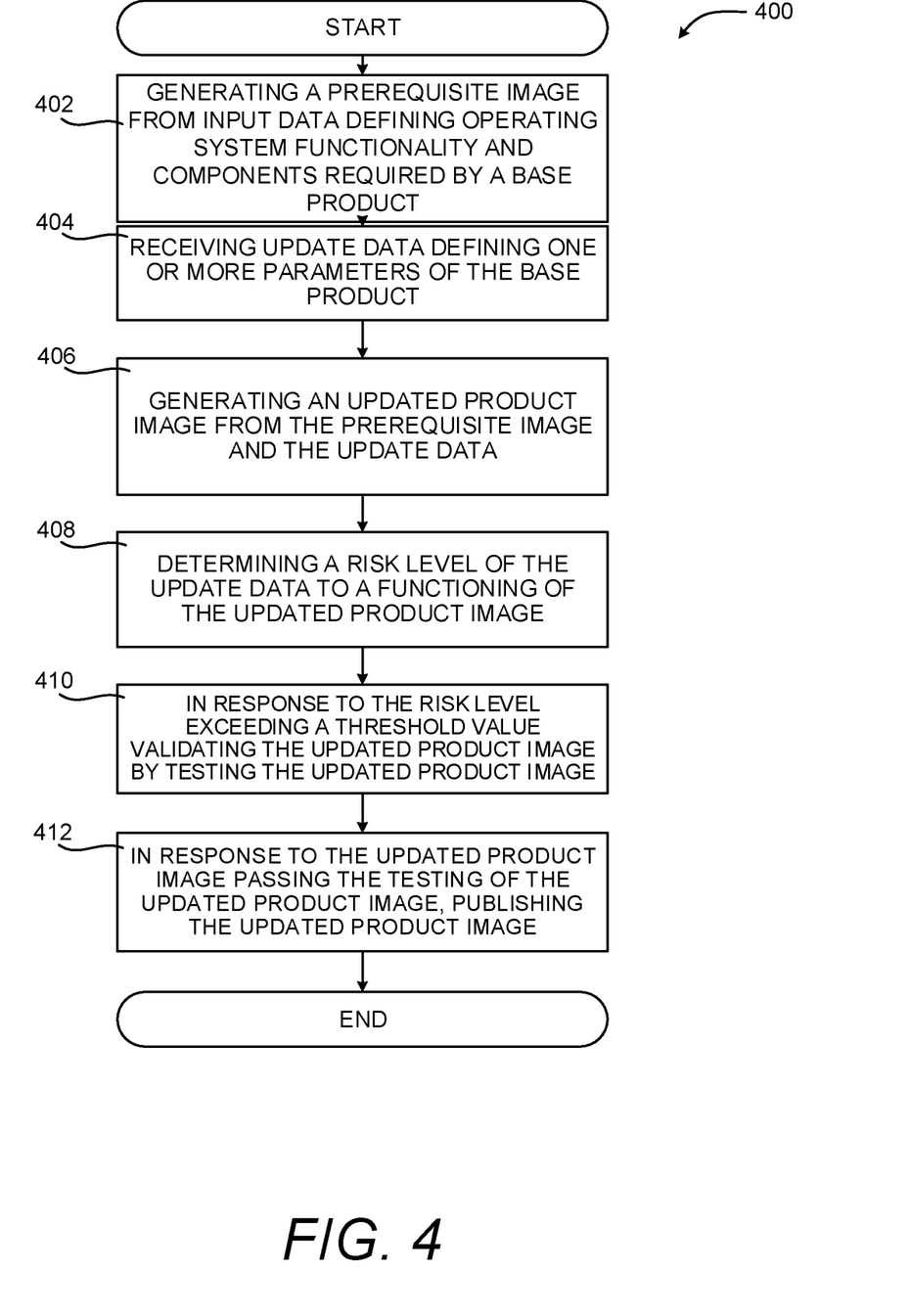
FIG. 4 is a flow diagram illustrating one example of a computing device capable of the building and validating of an updated VM product image.

FIG. 2, FIG. 3, and FIG. 4 are flow diagrams illustrating examples of a method 200, a system 300, or a computing device 400 capable of the building and validating of an updated VM product image 150. It should be understood by those of ordinary skill in the art that the operations of the method 200, system 300, or computing device 400 disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated operations can end at any time and need not be performed in their entireties. Some or all operations, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

FIG. 2 is a flow diagram illustrating one example of a method 200 of the building and validating of an updated VM product image 150. Method 200 can be automated within a data pipeline 102, wherein the data pipeline 102 occurs within at least a computing device, a network of computing devices, or a data center of computing devices.

The method 200 begins at operation 202, where generating a prerequisite image from input data defining operating system functionality and components required by a base product.

Next, at operation 204, where receiving update data defining one or more parameters of the base product. The one or more parameters can be the base product and/or updates to the base product. For example, Microsoft SharePoint is a product.

Next, at operation 206, where generating an updated product image from the prerequisite image and the update data. The generating the updated product image from the prerequisite image and the update data includes the updated product image being generated by applying the one or more parameters of the product to the prerequisite image.

Next, at operation 208, where determining a risk level of the update data to a functioning of the updated product image. The risk level of the update data to the functionality of the updated product image can be determined by receiving the level of risk from an outside source, an inside source, historical data, or a user.

Next, at operation 210, where in response to the risk level exceeding a threshold value, selecting a subset of tests from a plurality of tests comprising image test procedures or non-image test procedures, where in the selection of the subset of tests based on the risk level.

Next, at operation 212, testing the updated product image using the subset of test from the image test procedures and/or the non-image test procedures.

Next, at operation 214, where in response to the updated product image passing the testing of the updated product image, publishing the updated product image.

However, in response to the updated product image failing the testing of the updated product image, the automating stops, an error report is generated, and the error report is provided to a creator of the update data.

FIG. 3 is a flow diagram illustrating one example of a system 300 capable of the building and validating of an updated VM product image 150. System 300 can be automated within a data pipeline 102, wherein the data pipeline 102 occurs within at least a computing device, a network of computing devices, or a data center of computing devices.

The system 300 begins at operation 302, where generating a prerequisite image from input data defining operating system functionality and components required by a base product.

Next, at operation 304, where receiving update data defining one or more parameters of the base product. The one or more parameters can be the base product and/or updates to the base product. For example, Microsoft SharePoint is a product.

Next, at operation 306, where generating an updated product image from the prerequisite image and the update data. The generating the updated product image from the prerequisite image and the update data includes the updated product image being generated by applying the one or more parameters of the product to the prerequisite image.

Next, at operation 308, where determining a risk level of the update data to a functioning of the updated product image. For examples, the risk level can be based on length of time of a test to validate the updated product image, the risk level can be based on a type of the update data of the updated product image, the risk level can be based on at least a type of one of the one or more parameters of the product, and/or the risk level can be based on at least a value of one of the one or more parameters of the product.

Next, at operation 310, where in response to the risk level exceeding a threshold value, validating the updated product image by testing the updated product image using image testing procedures.

Next, at operation 312, where in response to the updated product image passing the testing of the updated product image, publishing the updated product image.

However, in response to the updated product image failing the testing of the updated product image, the automating stops, an error report is generated, and the error report is provided to an creator of the update data.

System 300 can be automated within a data pipeline 102, wherein the data pipeline 102 occurs within at least a computing device, a network of computing devices, or a data center of computing devices.

FIG. 4 is a flow diagram illustrating one example of a computing device 400 capable of the building and validating of an updated VM product image 150. The building and validating of an updated VM product image 150 can be automated within a data pipeline, wherein the data pipeline occurs within the computing device 400.

The system 400 begins at operation 402, where generating a prerequisite image from input data defining operating system functionality and components required by a base product.

Next, at operation 404, where receiving update data defining one or more parameters of the base product. The one or more parameters can be the base product and/or updates to the base product. For example, Microsoft SharePoint is a product.

Next, at operation 406, where generating an updated product image from the prerequisite image and the update data. The generating the updated product image from the prerequisite image and the update data includes the updated product image being generated by applying the one or more parameters of the product to the prerequisite image.

Next, at operation 408, where determining a risk level of the update data to a functioning of the updated product image. For examples, the risk level can be based on length of time of a test to validate the updated product image, the risk level can be based on a type of the update data of the updated product image, the risk level can be based on at least a type of one of the one or more parameters of the product, and/or the risk level can be based on at least a value of one of the one or more parameters of the product.

Next, at operation 410, where in response to the risk level exceeding a threshold value, validating the updated product image by testing the updated product image using image testing procedures.

Next, at operation 412, where in response to the updated product image passing the testing of the updated product image, publishing the updated product image.

However, in response to the updated product image failing the testing of the updated product image, the automating stops, an error report is generated, and the error report is provided to an creator of the update data.

Figure 5:
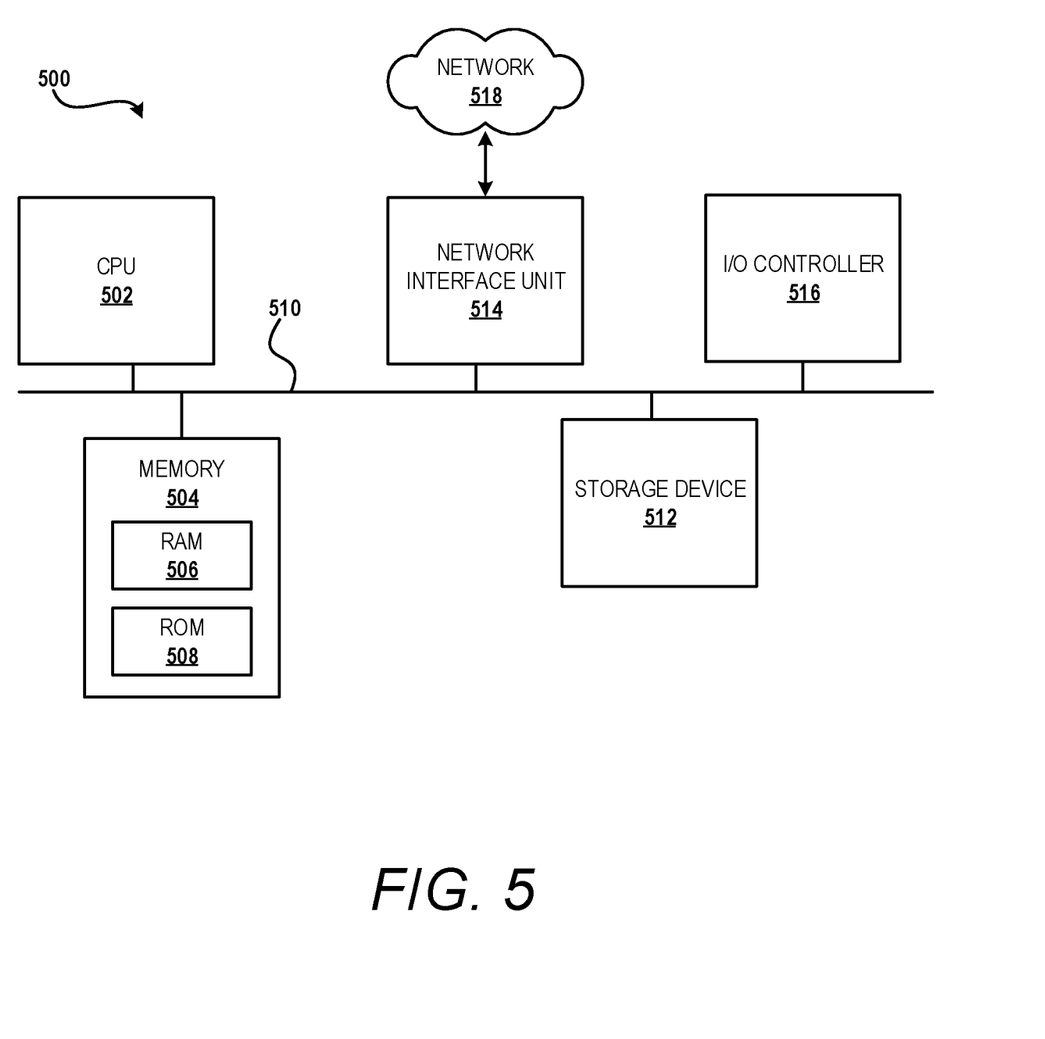
FIG. 5 shows an example computer architecture for a computer device capable of executing the techniques disclosed herein.

FIG. 5 shows details of an example computer architecture for a computer capable of executing the techniques disclosed herein. Thus, the computer architecture 500 illustrated in FIG. 5 illustrates an architecture for a client device, a server computer, or network of server computers, or any other types of computing devices suitable for implementing the functionality described herein. The computer architecture 500 may be utilized to execute any aspects of the computer readable instructions presented herein.

The computer architecture 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium," "computer-readable storage medium," or "computer-readable medium", and variations thereof, does not include waves, signals, and/or other transitory and/or intangible communication media, per se.

According to various techniques, the computer architecture 500 may operate in a networked environment using logical connections to remote computers through a network 518 and/or another network (not shown). The computer architecture 500 may connect to the network 518 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the computer readable instructions described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to computer readable instructions disclosed herein. These computer-executable instructions may transform the CPU 502 by specifying how the CPU 502 transitions between states, thereby transforming the transistors or other discrete hardware elements constituting the CPU 502.

Encoding the computer readable instructions presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the computer readable instructions disclosed herein may be encoded on the computer-readable media by transforming the physical state of the semiconductor memory. For example, the computer readable instructions may transform the state of transistors, capacitors, or other discrete circuit elements constituting the semiconductor memory. The computer readable instructions also may transform the physical state of such components in order to store data thereupon.

As another example, the computer-readable media disclosed herein may be implemented using magnetic or optical technology. In such implementations, the computer readable instructions presented herein may transform the physical state of magnetic or optical media, when the computer readable instructions are encoded therein. These transformations may include altering the magnetic characteristics of particular locations within given magnetic media. These transformations al so may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the computer readable instructions presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

What is claimed is:

1. A method, comprising:
generating a prerequisite image from input data defining operating system functionality and components required by a base product;
receiving update data defining one or more parameters of the base product;
generating an updated product image from the prerequisite image and the update data;
determining a risk level of the update data to a functioning of the updated product image, wherein the risk level is based on a length of time of a test to validate the updated product image;
in response to the length of time of the test to validate the updated product image exceeding a threshold value, selecting a subset of tests from a plurality of tests comprising image test procedures or non-image test procedures, wherein the selection of the subset of tests based on the risk level;
testing the updated product image using the subset of the tests that are selected in response to the length of time of the test to validate the updated product image exceeding the threshold value; and
in response to the updated product image passing the testing of the updated product image, publishing the updated product image.

2. The method of claim 1, further comprising:
generating the prerequisite image from the input data defining the operating system functionality and the components required by the base product, in association with a data pipeline;
receiving the update data defining the one or more parameters of the base product;
generating the updated product image from the prerequisite image and the update data;
determining the risk level of the update data to the functioning of the updated product image;
in response to the risk level exceeding the threshold value, selecting the subset of tests from the plurality of tests comprising the image test procedures or the non-image test procedures, wherein the selection of the subset of tests based on the risk level;
testing the updated product image using the subset of the tests; and
in response to the updated product image passing the testing of the updated product image, publishing the updated product image.

3. The method of claim 2, wherein the data pipeline occurs within at least a computing device, a network of computing devices, or a data center of computing devices.

4. The method of claim 2, further comprising:
in response to the updated product image failing the testing, an error report is generated, and the error report is provided to a creator of the update data.

5. The method of claim 1, wherein generating the updated product image from the prerequisite image and the update data includes the updated product image being generated by applying the one or more parameters of the product to the prerequisite image.

6. The method of claim 1, wherein the risk level is further based on a type of the update data of the updated product image.

7. The method of claim 1, wherein the risk level is further based on at least a type of one of the one or more parameters of the product.

8. The method of claim 1, wherein the risk level is further based on at least a value of one of the one or more parameters of the product.

9. The method of claim 1, further comprising:
in response to the updated product image failing the testing of the updated product image, an error report is generated and provided to a creator of the update data.

10. A system, comprising:
one or more processing units; and
a computer-readable medium having encoded thereon computer readable instructions to cause the one or more processing units to execute instructions comprising:
generating a prerequisite image from input data defining operating system functionality and components required by a base product;
receiving update data defining one or more parameters of the base product;
generating an updated product image from the prerequisite image and the update data;
determining a risk level of the update data to a functioning of the updated product image, wherein the risk level is based on a length of time of a test to validate the updated product image;
in response to the length of time of the test to validate the updated product image exceeding a threshold value, validating the updated product image by testing the updated product image using image testing procedures; and
in response to the updated product image passing the testing of the updated product image, publishing the updated product image.

11. The system of claim 10, further comprising:
generating, within a data pipeline, the prerequisite image from the input data defining the operating system functionality and the components required by the base product;
receiving the update data defining the one or more parameters of the base product;
generating, within the data pipeline, the updated product image from the prerequisite image and the update data;
determining the risk level of the update data to the functioning of the updated product image;
in response to the risk level exceeding the threshold value, validating the updated product image by testing the updated product image using image testing procedures; and
in response to the updated product image passing the testing of the updated product image, publishing the updated product image.

12. The system of claim 10, wherein the risk level further is based on a type of the update data of the updated product image.

13. The system of claim 10, wherein the risk level is further based on at least a type of one of the one or more parameters of the product.

14. The system of claim 10, wherein the risk level is further based on at least a value of one of the one or more parameters of the product.

15. A computing device, comprising:
a memory configured to store instructions; and
a processor coupled to the memory, the processor executing instructions comprising:
generating a prerequisite image from input data defining operating system functionality and components required by a base product;
receiving update data defining one or more parameters of the base product;
generating an updated product image from the prerequisite image and the update data;
determining a risk level of the update data to a functioning of the updated product image, wherein the risk level is based on a length of time of a test to validate the updated product image;
in response to the length of time of the test to validate the updated product image exceeding a threshold value, validating the updated product image by testing the updated product image using image testing procedures; and
in response to the updated product image passing the testing of the updated product image, publishing the updated product image.

16. The computing device of claim 15, further comprising:
automating within a data pipeline:
generating the prerequisite image from the input data defining the operating system functionality and the components required by the base product;
receiving the update data defining the one or more parameters of the base product;
generating the updated product image from the prerequisite image and the update data;
determining the risk level of the update data to the functioning of the updated product image;
in response to the risk level exceeding the threshold value, validating the updated product image by testing the updated product image using image testing procedures; and
in response to the updated product image passing the testing of the updated product image, publishing the updated product image.

17. The computing device of claim 15, wherein the risk level is further based on a type of the update data of the updated product image.

* * * * *